Feb. 21, 1933.  C. E. EVERETT ET AL  1,898,353
CULTIVATOR ATTACHMENT FOR TRACTORS
Filed June 13, 1932  3 Sheets-Sheet 1

INVENTORS.
Charles Edward Everett
Roy Eldon Smith
By A. E. Krotz ATTORNEY

Feb. 21, 1933.　　C. E. EVERETT ET AL　　1,898,353
CULTIVATOR ATTACHMENT FOR TRACTORS
Filed June 13, 1932　　3 Sheets-Sheet 2
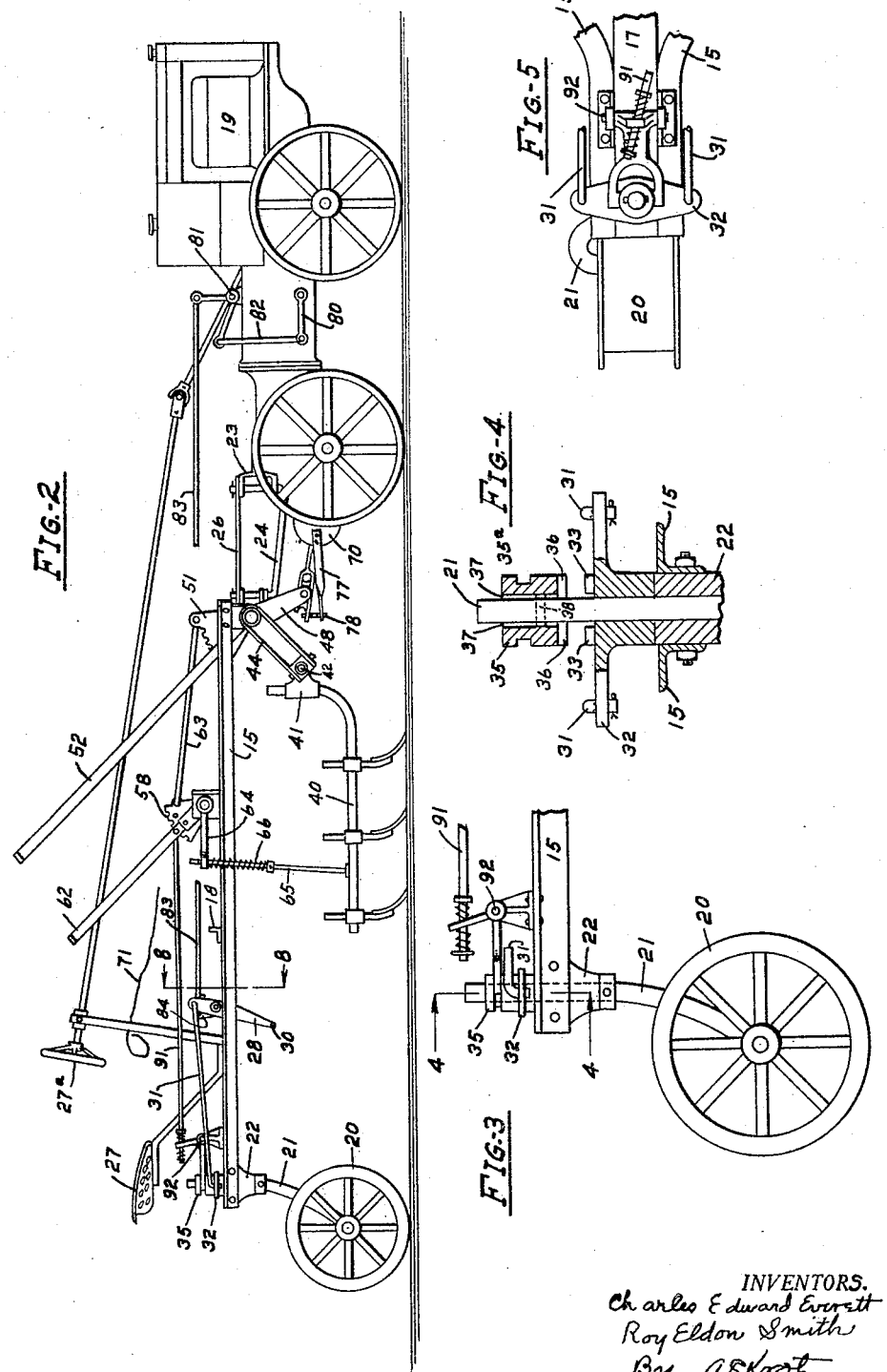
INVENTORS.
Charles Edward Everett
Roy Eldon Smith
By  a.s.Krob
ATTORNEY

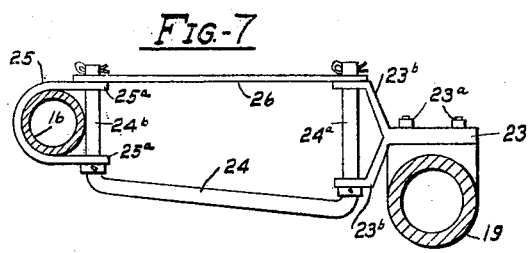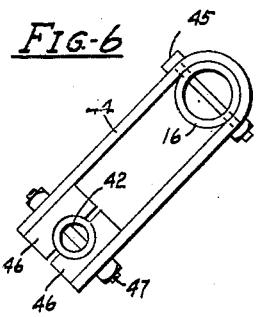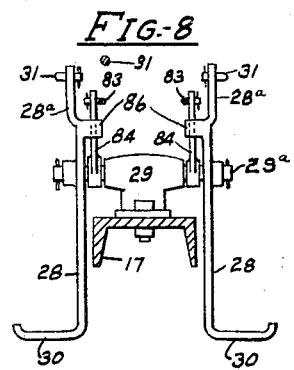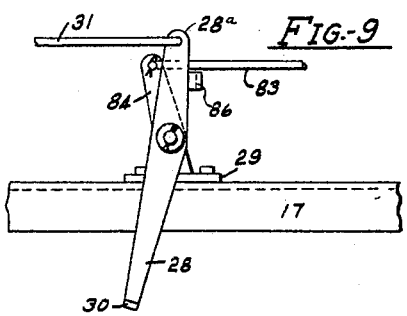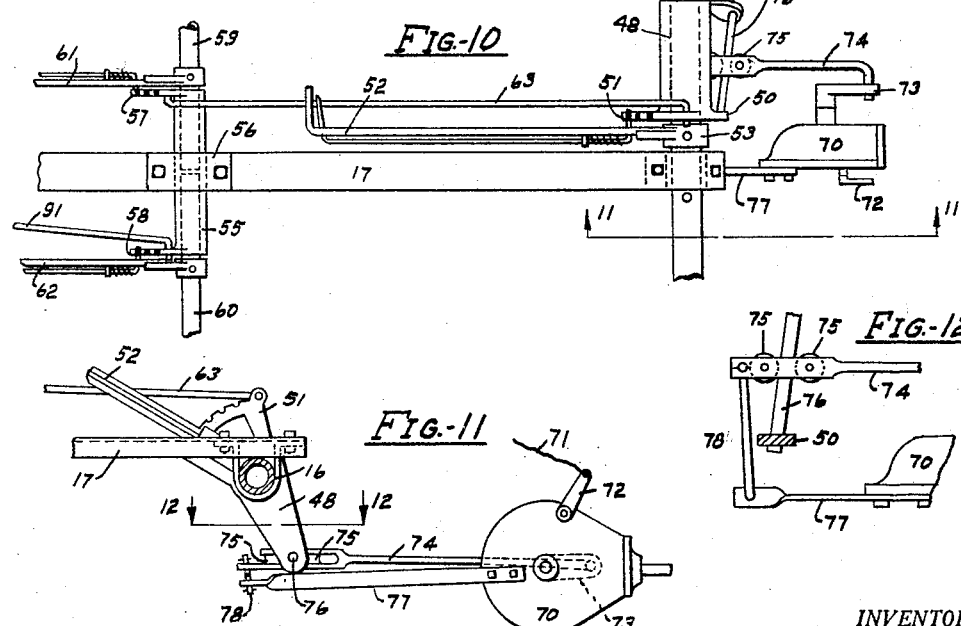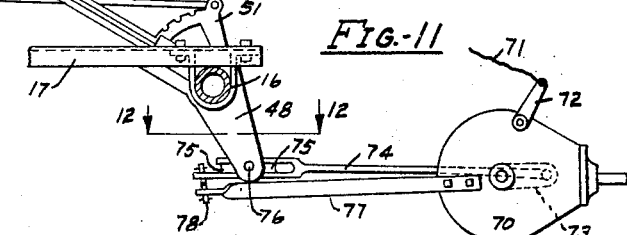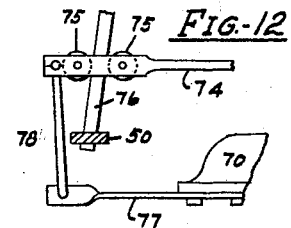

Patented Feb. 21, 1933

1,898,353

UNITED STATES PATENT OFFICE

CHARLES EDWARD EVERETT AND ROY ELDON SMITH, OF RACINE, WISCONSIN, ASSIGNORS TO THE MASSEY-HARRIS COMPANY, OF RACINE, WISCONSIN, A CORPORATION OF MARYLAND

CULTIVATOR ATTACHMENT FOR TRACTORS

Application filed June 13, 1932. Serial No. 616,892.

Our invention relates to cultivators designed to be pulled by and attached to tractors of a conventional type and in common use, preferably what is known as the wide tread type, and one of the objects thereof is to provide a cultivator of this class which may be readily attached to the tractor, and readily removed therefrom.

Another object of our invention is to provide a cultivator for tractors wherein the normal physical directional control of the cultivator is independent of the physical directional control of the tractor, and wherein the entire cultivator including the shovel gangs is as a unit manually directed through the medium of a rear end carrying and guiding wheel.

A further object of our invention is to provide a cultivating attachment for tractors, wherein the attachment may be normally directed transverse to the path of the tractor and independent therefrom, and wherein the tractor may be manually directed independent of the attachment. The cultivator guiding mechanism cooperating with instrumentalities whereby after the guiding means for the cultivator has reached a predetermined position in either direction a further movement of the guiding means will operate to guide the tractor in the same direction.

A further object of our invention is to provide a cultivating attachment for tractors, wherein the rear end is supported by means of a manually directed centrally positioned caster wheel and the front end supported by the rear end of the tractor through draft instrumentalities whereby the front end of the attachment is carried by and held upright but permitted to be moved transverse to the path of travel of the tractor, and the tractor permitted to turn in either direction within predetermined limits independent of the cultivator.

A further object of our invention is to provide a cultivator attachment for tractors wherein the depth and tilt of the shovels can be controlled by means of conveniently positioned levers cooperating with power lifting instrumentalities whereby the shovels are at all times under convenient and complete control by the operator, and whereby the power lifting device will not alter the depth of the shovels when the cultivator is moved transverse to the path traveled by the tractor.

It is also an object, to provide certain details and features of construction and combination of parts, tending to increase the general efficiency and convenience of operation of a tractor drawn cultivator of this general construction.

To these and other useful ends the invention consists in matters hereinafter set forth and claimed and shown in the accompanying drawings in which—

Figure 2 is a side elevation of our invention shown as attached to a similar tractor as in Figure 1.

Figure 3 is an enlarged side fractional view of our invention.

Figure 4 is an enlarged sectional view taken on line 4 of Figure 3.

Figure 5 is an enlarged top view of the parts shown in Figure 3.

Figure 6 is a detailed end view of the front cross member of the frame and the gang bar as viewed from line 6 of Figure 1.

Figure 7 is an enlarged side view of the draft links taken on line 7 of Figure 1.

Figure 8 is an enlarged fractional sectional view taken on line 8 of Figure 2 showing the pedal mechanism.

Figure 9 is an enlarged side view of the pedal mechanism, showing also a portion of the frame beam to which it is attached.

Figure 10 is an enlarged top view plan of the power lift and lever control mechanism.

Figure 11 is an enlarged side view showing the power lift and a fraction of the lever mechanism, taken on line 11 of Figure 10.

Figure 12 is a fractional top view of the power lift mechanism, taken on line 12 of Figure 11.

Figure 1:
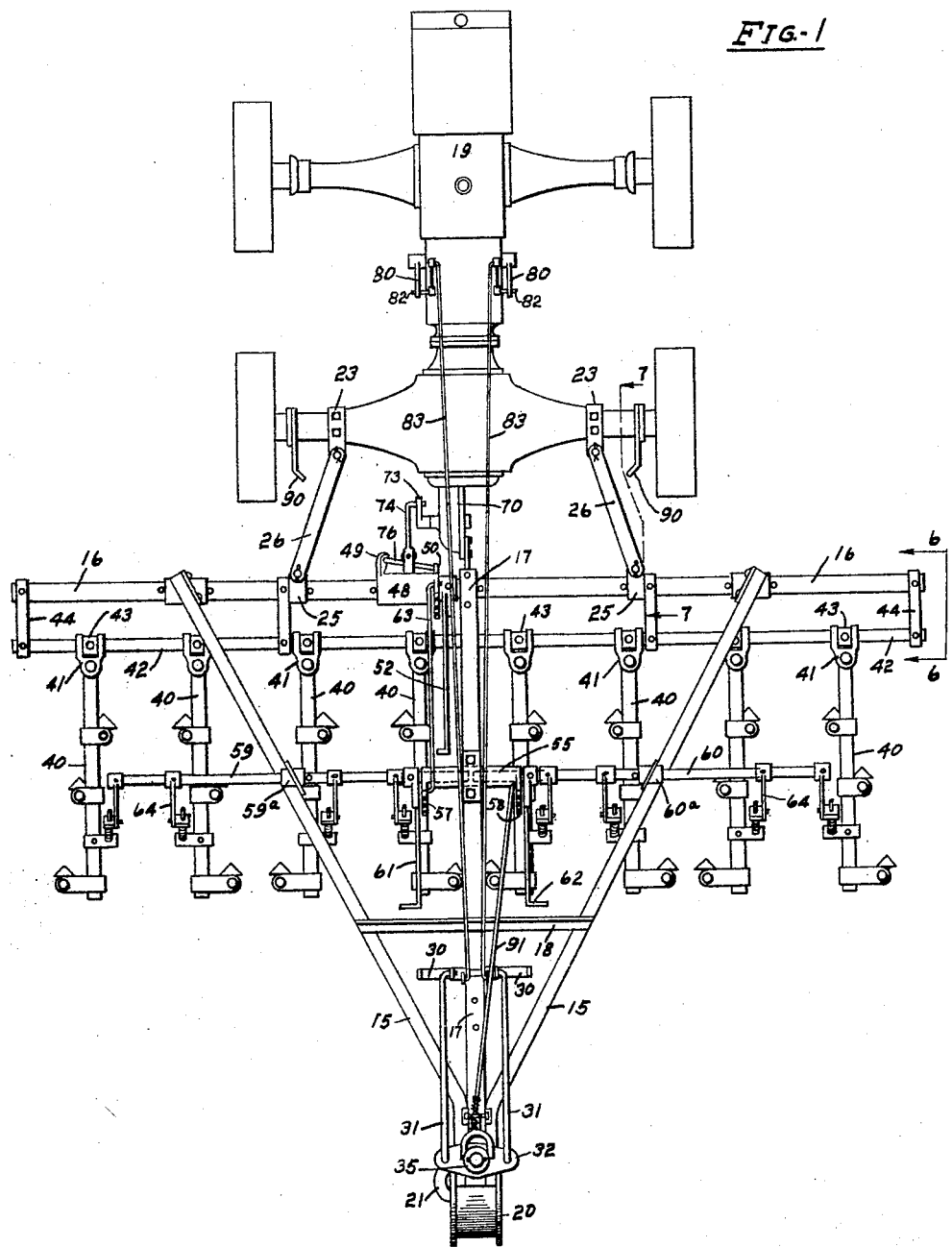
Figure 1 is a top view plan of our invention showing our improved cultivator attached to a tractor of a well known type.

As thus illustrated, the main frame of our invention comprises two side frame members 15, preferably made from angle iron and a front cross member 16 made from a substantial sized tube, forming a triangle which is reinforced by a central beam 17 and cross member 18. The tube, 16, for reasons which will hereinafter appear, is rotatably mounted on the front ends of side members 15 and beam 17.

As thus formed the main frame of our improved cultivator attachment is adapted to be supported at its front end by the tractor which is designated by the numeral 19, in a manner as will hereinafter appear, and at its rear end by means of ground wheel 20 through castered axle 21 which is loosely journaled in the bracket 22.

Brackets 23 are rigidly attached to the tractor 19 by means of bolts 23ª. These brackets, as indicated in Figure 1, are spaced apart an equal distance on either side of the center line of the tractor and having rearwardly extending portions 23ᵇ which are spaced apart as clearly indicated in Figure 7. Openings are provided in each of these extensions into which the upturned front end 24ª of draft links 24 are loosely journaled, thus forming a vertical axis whereby the rear ends of draft links 24 may swing sidewise or oscillate, thereby providing substantial transversely swinging carrying means for the front end of the frame and whereby the frame is held in an upright position. We accomplish these results by attaching the rear end of the draft links to the tube 16 in the following manner.

The U-shaped collars 25 are loosely journaled on tube 16 and are spaced a considerably greater distance apart than the distance between brackets 23 and at an equal distance on opposite sides of the center line of the frame as indicated in Figure 1.

The upturned rear ends of draft links 24 are loosely journaled in forwardly extending portions 25ª of collars 25 as indicated in Figure 7, thus forming a universal joint between the draft links 24 and tube 16. The bar 26 serves as a strengthening brace for draft links 24 and is positioned above 23 and 25 as indicated, thereby forming thrust and retaining surfaces for both.

It will be observed that our improved attachment is of an unstable character, while the tractor is a stable affair and can stand alone, therefore the attachment is dependent upon the tractor through the draft links 24 to carry and hold it in an upright position. It will further be observed that by reason of the way the draft links diverge rearwardly from the tractor that the tractor can turn to the right or left independent of the attachment and that the pull of the tractor will not seriously tend to hold the attachment on the center line of the tractor. It will further be seen that the attachment will be free to move back and forth transverse to the path traveled by the tractor,—also, that the rear end of the attachment is free to move up and down independent of the tractor as the carrying wheel moves over uneven ground.

When our improved cultivator attachment is in operation the tractor is operated by what is commonly termed "remote control"; that is, the operator's seat 27 is suitably mounted on the rear end of the frame of the attachment as indicated in Figure 2 and the tractor control levers and steering wheel 27ª are positioned within easy reach of the operator by means of extensions, etc.

The guiding mechanism whereby the operator guides the attachment independent of the tractor thereby to follow the row crop being cultivated, comprises foot levers 28, which are pivoted on opposite sides of bracket 29 by means of bolt 29ª. The depending ends of these levers are provided with foot rests 30, and the upward extending ends 28ª of levers 28 are connected by means of links 31, to opposite ends of steering bar 32, which is loosely journaled on shaft 21. This steering bar 32 is on its top surface on opposite sides of the axle 21 provided with projections or keys 33.

The collar 35 loosely embraces the axle 21 and is provided on its bottom with key seats 36 which are adapted to engage the keys 33 when the collar is resting on the steering bar 32. Suitable keyways 37 are provided in collar 35 and a key or pin 38 is inserted in the axle 21 whereby the collar 35 is keyed against turning to the axle 21 but is free to move endwise and into or out of engagement with the steering bar 32.

The keyways 36 in collar 35 are positioned in the collar at right angle to the wheel 20 or in a position parallel to the axis of the wheel. The keys 33 on arm 32 are positioned on opposite sides of and adjacent the axle 21 and on a center line with the arm 32 and parallel thereto. Therefore, this arm 32 must be parallel to the axis of the wheel 20 before keys 33 will engage keyways 36. Thus when the wheel 20 is in a normal operating position and the arm 32 engages the collar 35, the depending levers 28 and their foot rests 30 will also be in their normal operating position as indicated in Figures 1 and 2.

In practice the operator will occupy the seat 27 with his feet on the foot rests 30. When the collar 35 engages the steering bar 32 the operator can turn the wheel 20 to the right or left by pressing on the right or left foot rest 30, thus guiding or directing the rear end of the attachment to the right or left. Obviously the front end of the attachment will be moved in the same direction as the rear and about the same distance. Furthermore, in practice when the tractor is turned to the right or left it will exercise very little or no influence over the course over which the attachment is manually directed, because of the position of the draft links, except to assist in bringing the attachment back to a normal position as the tractor is so directed.

As thus described it will be seen that any form of shovel gang or ground working means may be attached directly to and guided by the frame of our improved cultivating attachment.

As illustrated, the numeral 40 designates a well known type of shovel gang, eight being shown as the number required to successfully cultivate four rows at one operation. The front ends of these gangs are rigidly attached to brackets 41 which are journaled loosely on the gang bar 42 and held in any desired transverse position by means of collars 43 whereby the gangs may be adjusted laterally for close cultivating or adjusted to any row spacing.

As thus constructed the gangs cannot swing sidewise independent of the frame but can, however, move up and down at their rear ends inasmuch as the bracket 41 can rotate on the bar 42.

The gang bar 42 is rigidly attached to tube 16 and held in the proper spaced relation by means of U-shaped arms 44 made fast to tube 16 by means of bolt 45 and to gang bar 42 by means of blocks 46 and bolt 47. The normal operating position of the gang bar is shown in Figure 2.

A sleeve 48 is rotatably journaled on tube 16 but held and controlled through depending arms 49 and 50 in a manner which will hereinafter appear, a notched sector 51 is mounted on the right end of this sleeve, lever 52 is rigidly attached to tube 16 by means of lever socket 53 and is provided with the customary latch for engagement with the notches on the sector whereby the tube 16 may be turned in its bearings and held in any desired position, thereby to raise or lower the front ends of all of the gangs.

Sleeve 55 is rotatably mounted on beam 17 by means of bearing bracket 56, notched sectors 57 and 58 are positioned on opposite ends of sleeve 55, the inner ends of tubes 59 and 60 are loosely journaled in sleeve 55, lever 61 is rigidly attached to tube 59 and is adapted to engage the notches in sector 57 by means of the customary latch, lever 62 is likewise rigidly attached to tube 60 and is also provided with a latch for engagement with notches in sector 58.

The rod 63 makes a suitable connection between sectors 51 and 57, whereby when the sleeve 50 is operated to turn the tube 16 as will hereinafter appear, the tubes 59 and 60 will also be turned in the same direction, the relative position of tube 16 with that of tubes 59 and 60 being subject to the position of the levers on their respective sectors.

Tubes 59 and 60 are supported on side frame members 15 by means of bearing brackets 59ª and 60ª and they extend far enough from the center line of the frame so their outer ends will be directly over the outside gang when set in its farthest out position on gang bar 42. Each gang is connected to its respective tube by means of arms 64 and rod 65. Springs 66 are provided, as is customary, whereby the individual gangs may pass over obstructions, or when desired, all of the gangs may be held down by means of spring pressure.

As thus constructed it will be seen that by rocking the tube 16 by means of lever 52 the front ends of all of the gangs will be raised or lowered and that the rear ends of the gangs on the right hand side of the frame may be raised or lowered by operating lever 62. All of the gangs on the left side may likewise be raised or lowered by means of lever 61, and in whatever position the gangs may be by reason of the position of the three levers; if the sleeve 50 is turned all of the gangs will be raised or lowered at both their front and rear ends.

The power lift as designated by the numeral 70 is not shown in detail as the same may be of various forms which are in common use on tractors, plows, etc. This lift is adapted to be operated by pulling the rope 71 which is connected to lever 72. When the lift is in the position shown in the various figures, the gangs will be held in their operating position by means of crank 73 through the connecting rod 74, the rear ends of which carry the two sheave pulleys 75. These pulleys loosely embrace the shaft 76. This shaft is supported at its ends by means of the depending arms 49 and 50 and at an angle to tube 16 as clearly indicated in Figure 10 for reasons which will hereinafter appear.

As previously explained, when in operation the attachment is moved back and forth transversely to the tractor. The shaft 76 will therefore move back and forth between the pulleys 75. In order to prevent the connecting rod 74 from following this movement the rear end of 74 is anchored to the bar 77 by means of link 78.

When it is desired to lift all of the gangs the lever 72 is operated by pulling the rope 71. The power lift mechanism will then operate to turn the crank 73 a one-half turn, thereby moving the shaft 76 rearwardly and rocking the sleeve 48, thus raising all of the gangs. Another pull of the rope 71 will cause the crank 73 to return to its former position and thereby lower all of the gangs.

It will be seen that the shaft 76 and rod 74 are a considerable distance to the left from the center line of the frame. The peculiar action of the diverging draft links 24 causes the frame to move fore and aft at the point where the pulleys 75 embrace the shaft 76 which is positioned at an angle vertically as shown to counteract this movement and thereby prevent a slight raising and lowering of the gangs as the attachment is shifted to the right or left.

It has been found, in practice, that it is a considerable advantage to the operator to be able to make quicker and shorter turns at the end of rows than is possible by means of the regular tractor steering wheel. The tractor shown is of a well-known type wherein short turns are made by means of a brake system whereby one side or the other can be slowed down or even stopped by operating either the right or left hand brakes which are positioned on opposite sides of the differential.

The numeral 80 designates two brake operating levers, one on the right side of the tractor and the other on the left. When either lever is depressed its companion brake will be caused to operate and if the pressure is hard enough, say on the right side, that side of the tractor will be locked and the other, or left side, will tend to travel around a circle.

The bell cranks, one on the right side of the tractor and the other on the left are pivotally mounted on the tractor at 81; the horizontal arms of the bell cranks are connected to the levers 80 by means of links 82; the vertical arms of the bell cranks are operated by means of rearwardly extending rods 83 which pivotally engage the levers 84 at their top ends, the bottom ends being pivotally mounted on opposite sides of bracket 29 and between this bracket and levers 28 by means of shaft 29ª. Lever extensions 28ª are provided with lugs 86 which are positioned and of a length whereby they come in contact with levers 84 in the following manner:

The rods 83 are of such a length as will normally hold the levers 84 out of contact with the lugs, that is, for normally guiding the attachment the lugs 86 will seldom touch the levers 84, but when the operator wishes to make a short turn and after the gangs have already been lifted and the sleeve 35 has been disengaged from steering bar 32, for reasons which will hereinafter appear, he does so by pressing hard on one or the other foot rest 30. For example, if the operator wishes to make a short right hand turn he simply presses hard on the right hand foot rest 30 whereby lug 86 will contact with and move the right hand lever 84 rearwardly and operate to set the right hand brake by depressing lever 80 on the right hand side of the tractor. In order to prevent the draft links 24 from coming in contact with the rear wheels of the tractor when making short turns the stops 90 are provided. When one of the stops contacts with a draft link a further turn of the tractor will force the rear end of the attachment to swing sidewise and follow the tractor, the wheel 20 being then free to caster around on the upper end of axle 21 as an axis for the following reasons:

When the power lift is operated to lift the gangs, collar 35 will be lifted out of engagement from guiding bar 32 in the following manner: Rod 91 is pivotally connected at its forward end to sector 58 and at its rear end flexibly connected to the vertical lever of a bell crank which is pivotally mounted as at 92; the horizontal portion of this bell crank is forked as indicated in Figure 5, each fork end having inwardly projecting pins which loosely engage the groove 35ª in collar 35 whereby the collar is free to turn but will be raised or lowered when the bell crank is rocked on its pivot 92,—therefore, when the power lift operates to lift the gangs the rod 91 will be moved forward and the bell crank rocked on its pivot so as to lift the collar 35 out of engagement with steering bar 32.

It will be seen that the wheel 20 will be free to caster and will be disconnected from the guiding levers 28 when the gangs are lifted, at which time directional control will be limited to the tractor only, either through the brake mechanism or by means of the tractor steering wheel, but that when the gangs are again moved into working position directional control of the cultivating attachment will again be through guiding levers 28.

It will further be seen that the operator has at all times complete control of the depth and tilt of the shovels and sits in a position where the shovels and rows being cultivated are in full view. Obviously the gangs are always practically parallel with the rows and are easily made to follow the rows independent of the tractor, and the tractor may be directed to follow the rows by means of the steering wheel without in any way interfering with directional control of the attachment.

Obviously our improved attachment for tractors may be operated without the use of the power lift in which case the sector 51 would be mounted on the frame of the attachment and furthermore, that the attachment can be easily and quickly detached by simply disconnecting link 74 and brackets 23 and moving the seat 27 and steering wheel 27ª back to their original position on the tractor, or vice versa.

Various changes in details may be made and our improved attachment may also be attached to many other types of tractors or pulling means with or without some of the special details and features shown and described without departing from the spirit and scope of our invention, and therefore we do not wish to be limited to specific details of construction herein shown.

Having thus described and explained our invention we claim as new and desire to secure by Letters Patent:

1. A cultivator attachment for tractors, comprising a unitary frame, shovel gangs attached to the forward end thereof, a centrally positioned carrying and guiding wheel at the rear end of said frame, a pair of draft links spaced apart and pivotally mounted to the forward end of said frame and adapted to be attached to the rear end of a tractor by means of vertical hinges whereby the forward end of said frame is carried and held in an upright position by said tractor, means for manually directing said guiding wheel cooperating with said draft links whereby said frame may be moved across the path of travel of said tractor.

2. A cultivator attachment for tractors, comprising a unitary frame, shovel gangs attached to the forward end thereof, a centrally positioned carrying and guiding wheel at the rear end of said frame, a pair of draft links spaced apart and pivotally mounted to the front end of said frame and adapted to be attached to the rear end of a tractor by means of vertical hinges whose distance apart is less than the distance between the rear ends of said draft links, said draft links cooperating with said carrying wheel whereby said frame may be normally moved or guided sidewise independent of said tractor and said tractor normally turned to the right or left independent of said frame.

3. A cultivator attachment for tractors, comprising a unitary frame, shovel gangs attached to the forward end thereof, a centrally positioned carrying and guiding wheel at the rear end of said frame, a pair of draft links spaced apart and pivotally mounted to the front end of said frame, the front end of which is adapted to be attached to the rear end of a tractor by means of vertical hinges whereby the front end of said frame is carried and said frame held in an upright position, said draft links cooperating with manually controlled means connected to said guiding wheel, whereby said frame may be moved across the path of travel and independent of said tractor.

4. A cultivator attachment for tractors, comprising a unitary frame, shovel gangs attached to the forward end thereof, a rear carrying and guiding wheel, a pair of draft links spaced apart and adapted to be attached to the rear end of a tractor whereby the front end of said frame is carried and held in an upright position, means for manually directing said carrying wheel, whereby said frame is guided independent of said tractor.

5. A structure as specified in claim 4, in combination with said draft links universally pivoted at one end and vertically pivoted at the other, the forward pivots of which are spaced at a less distance than the distance between pivots at the rear ends, whereby said tractor may be normally guided independent of said frame.

6. A structure as specified in claim 4, in combination with a supplementary guiding means on the tractor and instrumentalities whereby when said directing means is moved to a predetermined position, a further movement will act on said supplementary means to guide the tractor in the same direction.

7. A cultivator attachment for tractors, comprising a unitary frame, vertically swinging shovel gangs attached to the forward end thereof, a rear carrying and guiding wheel, means for manually directing said guiding wheel, a pair of draft links spaced apart and adapted to be attached to the rear end of a tractor thereby to carry said frame and hold it in an upright position but permit free transverse movement of said frame, a power lift attached to the tractor and adapted to lift said gangs or hold them in a working position, instrumentalities whereby said gangs may be manually controlled as to tilt and depth.

8. A structure as specified in claim 7, in combination with said power lift operating through a connection whose rear or free end is held from following the movement of said frame by means of a link whose anchor is attached to said power lift.

9. A cultivator attachment for tractors comprising a unitary frame, a rear carrying and guiding wheel and means whereby the front end of said frame is adapted to be carried by a tractor and held in an upright position thereby but permitted to move across the path of said tractor, a pivoted cross member on the forward end of said frame having a parallel member held rigidly thereto, shovel gangs horizontally pivoted at their forward ends to said parallel member and means whereby the rear end of said gangs may be manually controlled as to depth and instrumentalities whereby said parallel member may be manually raised and lowered independent of or simultaneously with the rear end of said gangs, and a power lift attached to said pivoted cross member whereby said gangs are lifted or held in an operating position.

10. A cultivator attachment for tractors, comprising a unitary frame, shovel gangs attached to the forward end thereof, a rear guiding and carrying caster wheel, a pair of draft links spaced apart and attached to the front end of said frame and adapted to be attached to the rear end of a tractor, whereby the front end of said frame is carried and the attachment is held in an upright position but permitted to swing sidewise, means for physically directing said carrying wheel thereby to guide said frame across the path traveled by the tractor, a power lift adapted to raise and lower said gangs and means whereby said manual guiding control is disengaged from said caster wheel when said power lift operates to lift said gangs, and a limit stop on said tractor, thereby to turn said attachment when said caster wheel is disengaged.

CHARLES EDWARD EVERETT.
ROY ELDON SMITH.